United States Patent
Kuo et al.

(10) Patent No.: US 9,990,052 B2
(45) Date of Patent: *Jun. 5, 2018

(54) INTENT-AWARE KEYBOARD

(71) Applicant: MICROSOFT TECHNOLOGY LICENSING, LLC, Redmond, WA (US)

(72) Inventors: Yu-Ting Kuo, Sammamish, WA (US); Antonio Gulli, Pisa (IT); Kuansan Wang, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/377,155

(22) Filed: Dec. 13, 2016

(65) Prior Publication Data

US 2017/0090595 A1 Mar. 30, 2017

Related U.S. Application Data

(63) Continuation of application No. 13/922,544, filed on Jun. 20, 2013, now Pat. No. 9,576,074.

(51) Int. Cl.

| G06F 17/00 | (2006.01) |
| G06F 3/023 | (2006.01) |
| G06F 17/30 | (2006.01) |
| G06F 3/0488 | (2013.01) |
| G06F 3/0482 | (2013.01) |
| G06F 17/24 | (2006.01) |
| G06F 3/01 | (2006.01) |

(52) U.S. Cl.
CPC ........ *G06F 3/0237* (2013.01); *G06F 3/04886* (2013.01); *G06F 17/3097* (2013.01); *G06F 17/30867* (2013.01); *G06F 3/017* (2013.01); *G06F 3/0482* (2013.01); *G06F 17/24* (2013.01)

(58) Field of Classification Search
CPC .................... G06F 17/30672; G06F 17/30867
See application file for complete search history.

(56) References Cited

U.S. PATENT DOCUMENTS

2006/0259479 A1  11/2006  Dai

OTHER PUBLICATIONS

"Office Action Issued in European Patent Application No. 14737387.2", dated Dec. 20, 2017, 8 Pages.

*Primary Examiner* — Truong Vo
(74) *Attorney, Agent, or Firm* — Shook, Hardy & Bacon, L.L.P.

(57) ABSTRACT

Systems, methods, and computer storage media having computer-executable instructions embodied thereon that provide contextual services are provided. Embodiments of the present invention allow an input mechanism to provide contextual services. Exemplary input mechanisms include a keyboard, a gesture interface, and a speech interface. These inputs may be used to provide user input into one or more applications running on a computer. The contextual services provided include composition assistance, grammatical assistance, communication-context assistance, and research assistance. In one embodiment, an input mechanism ("IME") program provides the contextual service. The IME program may work with a remote contextual-service provider. The IME program communicates user input and contextual information to the contextual-service provider. The contextual-service provider analyzes the input and contextual information to determine whether one or more contextual services should be provided.

20 Claims, 8 Drawing Sheets

US 9,990,052 B2

INTENT-AWARE KEYBOARD

CROSS REFERENCE TO RELATED APPLICATIONS

This application is a continuation of U.S. patent application Ser. No. 13/922,544, filed Jun. 20, 2013, and titled "INTENT-AWARE KEYBOARD," the entirety of which is hereby incorporated by reference.

BACKGROUND

Many computing device users are habitual, or at least engage in some reasonably predictable behaviors on a routine basis. For instance, a particular user may routinely conduct a search for "world news" first thing in the morning to view headlines from prominent overnight news stories. Or, a user may have been engaged in an email conversation with a friend early in the day and, a few hours later, conduct a search for information about a book the friend recommended during the conversation. While each of these scenarios is somewhat predictable, at least with a degree of confidence greater than that of purely random search behavior, they still require that the user access an online search application and type one or more search query terms to access the information (and/or links to the information) she desires to access.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention allow an input mechanism to provide contextual services. Exemplary input mechanisms include a keyboard, a gesture interface, and a speech interface. These inputs may be used to provide user input into one or more applications running on a computer. The user input may be a control input, such as selecting a button, or language input, such as typing letters or characters.

The contextual services provided include composition assistance, grammatical assistance, communication-context assistance, and research assistance. The composition assistance may take the form of an auto complete or auto suggest feature. The research assistance may take the form of a contextual search result, a contextual query suggestion, and knowledgebase entries. The grammatical assistance may provide entries from a dictionary or usage guide. The communication-context assistance may be search results showing social posts or communications (e.g. texts and emails) associated with an intended recipient of a communication being drafted. For example, the communication assistance may be links to social posts related to a recipient of an email being drafted. In another example, emails previously sent with similar subject matter may be provided as a search result.

In one embodiment, an input mechanism ("IME") program provides the contextual service. The IME program may work with a remote contextual-service provider. The remote contextual-service provider may operate in a data center and provide contextual services to numerous devices. The IME program communicates user input and contextual information to the contextual-service provider. The contextual-service provider analyzes the input and contextual information to determine whether one or more contextual services should be provided. Each contextual service may have a separate set of trigger mechanisms that are used to determine when the contextual service would be useful to a user.

BRIEF DESCRIPTION OF THE DRAWINGS

The present invention is illustrated by way of example and not limited in the accompanying figures in which like reference numerals indicate similar elements and in which.

DETAILED DESCRIPTION

Figure 1:
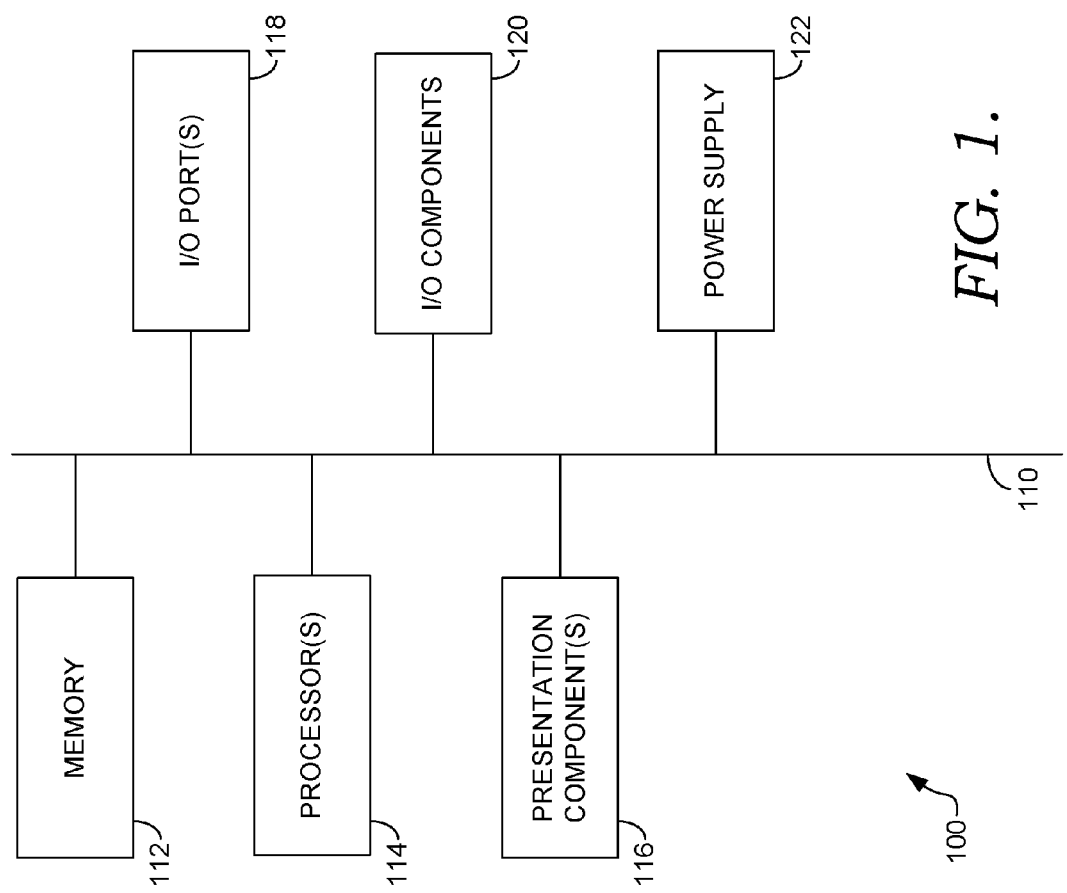
FIG. 1 is a block diagram of an exemplary computing environment suitable for implementing embodiments of the invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention allow an input mechanism to provide contextual services. Exemplary input mechanisms include a keyboard, a gesture interface, and a speech interface. These inputs may be used to provide user input into one or more applications running on a computer. The user input may be a control input, such as selecting a button, or language input, such as typing letters or characters.

The contextual services provided include composition assistance, grammatical assistance, communication-context assistance, and research assistance. The composition assistance may take the form of an auto complete or auto suggest feature. The research assistance may take the form of a contextual search result, a contextual query suggestion, and knowledgebase entries. The grammatical assistance may provide entries from a dictionary or usage guide. The communication-context assistance may be search results showing social posts or communications (e.g. texts and emails) associated with an intended recipient of a communication being drafted. For example, the communication assistance may be links to social posts related to a recipient of an email being drafted. In another example, emails previously sent with similar subject matter may be provided as a search result.

In one embodiment, an input mechanism ("IME") program provides the contextual service. The IME program enables operation of the input mechanism. In one embodiment, the IME program is part of an operating system running on a computing device. In another embodiment, the IME is an application that translates input data received from the input mechanism hardware into input that is consumable by multiple applications. For example, the IME may provide a touch screen keyboard that is usable with multiple applications on a mobile device.

The IME program may work with a remote contextual-service provider. The remote contextual-service provider may operate in a data center and provide contextual services to numerous devices. The IME program communicates user input and contextual information to the contextual-service provider. The contextual-service provider analyzes the input and contextual information to determine whether one or more contextual services should be provided. Each contextual service may have a separate set of trigger mechanisms that are used to determine when the contextual service would be useful to a user.

The IME program may communicate contextual information to the contextual-service provider, in addition to input (e.g. keystrokes). Contextual information associated with a user is identified and utilized to predict one or more contextual services that the user is likely to desire to access at a particular point in time, e.g., the point in time at which the contextual services are determined. Contextual information may describe habitual or routine behaviors of the user and/or indicators associated with events, activities or behaviors of the user and may include, by way of example only, routine search behaviors, recent text and/or email conversations engaged in by the user, events scheduled on the user's electronic calendar, multimedia events engaged in by the user (such as listening to music, watching television programming, etc.), and the like. For instance, a user may routinely search for traffic reports around 7:00 a.m. Thus, contextual services provided during the early morning hours may include traffic information (and/or links thereto).

Or, a user's electronic calendar may indicate they have a lunch appointment across town. In this instance, contextual services provided during the two hours prior to the lunch appointment may include directions to the restaurant and/or a link to the restaurant's lunch specials for the day. The identified contextual services are contextual services that, based on the context surrounding the user either routinely/habitually or specific to a particular point in time, the user has an increased likelihood (relative to information unrelated to the current context surrounding the user) of desiring to access.

Upon receiving an indication that the user desires to perform a context-aware search, the identified contextual services (or links thereto) are presented automatically to the user, that is, without the user having to input any search query terms. The indication that the user desires to perform a context-aware search may be received, for instance, upon receiving an indication that has paused while composing a document. As the identified contextual services are presented without user input of any search query terms into the contextual search, the contextual services are quickly and efficiently presented to the user, with minimal user effort.

Also presented within a contextual service box is a search query input region configured for receiving user-input search query terms. As such, if the presented information (and/or information links) does not align with what the user wanted to have presented upon selecting the context-aware search button, he or she may input search query terms and a search will be conducted for information related to the input terms in a conventional manner, though with an enhanced assessment of the intent of the user which may prove beneficial in determining search results.

A user's response to an offered contextual service may be tracked and used to refine the system used to determine whether a particular contextual service is offered given a set of contextual circumstances. The actions of many users be tracked and recorded on a per user basis, aggregated into groups of users with similar characteristics or profiles, or aggregated across all users to determine when to offer a given service.

Some of the contextual services may be implemented locally with just a little information from the remote contextual-service provider. For example, composition assistance such as auto complete may be provided by the IME program by displaying auto complete options. Other contextual services are provided by the contextual-service provider in response to the selection of links or controls displayed by the IME program. For example, a link to a search result may be provided by the remote contextual-service provider which in turn displays a full set of search results upon selection of a search result. Alternatively, a knowledge based entry may be abbreviated within a contextual interface shown locally, but the full entry is provided upon receiving instruction from the user.

The input mechanism may have a button or other control to turn the contextual function on and off. For example, a keyboard may provide a contextual service button. When the contextual service is on, the contextual services are periodically provided when circumstances indicate that a user is likely to appreciate and use the service.

Having briefly described an overview of embodiments of the invention, an exemplary operating environment suitable for use in implementing embodiments of the invention is described below.

Exemplary Operating Environment

Referring to the drawings in general, and initially to FIG. 1 in particular, an exemplary operating environment for implementing embodiments of the invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Embodiments of the invention may be practiced in a variety of system configurations, including handheld devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component 120. Also, processors have memory. The inventors hereof recognize that such is the nature of the art, and reiterate that the diagram of FIG. 1 is merely illustrative of an exemplary computing device that can be used in connection with one or more embodiments of the invention. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Communication media does not fall within the scope of computer-storage media. Combinations of any of the above should also be included within the scope of computer-readable media.

Memory 112 includes computer-storage media in the form of volatile and/or nonvolatile memory. The memory 112 may be removable, nonremovable, or a combination thereof. Exemplary memory includes solid-state memory, hard drives, optical-disc drives, etc. Computing device 100 includes one or more processors 114 that read data from various entities such as bus 110, memory 112 or I/O components 120. Presentation component(s) 116 present data indications to a user or other device. Exemplary presentation components 116 include a display device, speaker, printing component, vibrating component, etc. I/O ports 118 allow computing device 100 to be logically coupled to other devices including I/O components 120, some of which may be built in. Illustrative I/O components 120 include a microphone, joystick, game pad, satellite dish, scanner, printer, wireless device, etc.

Exemplary Online Gaming Environment

Figure 2:
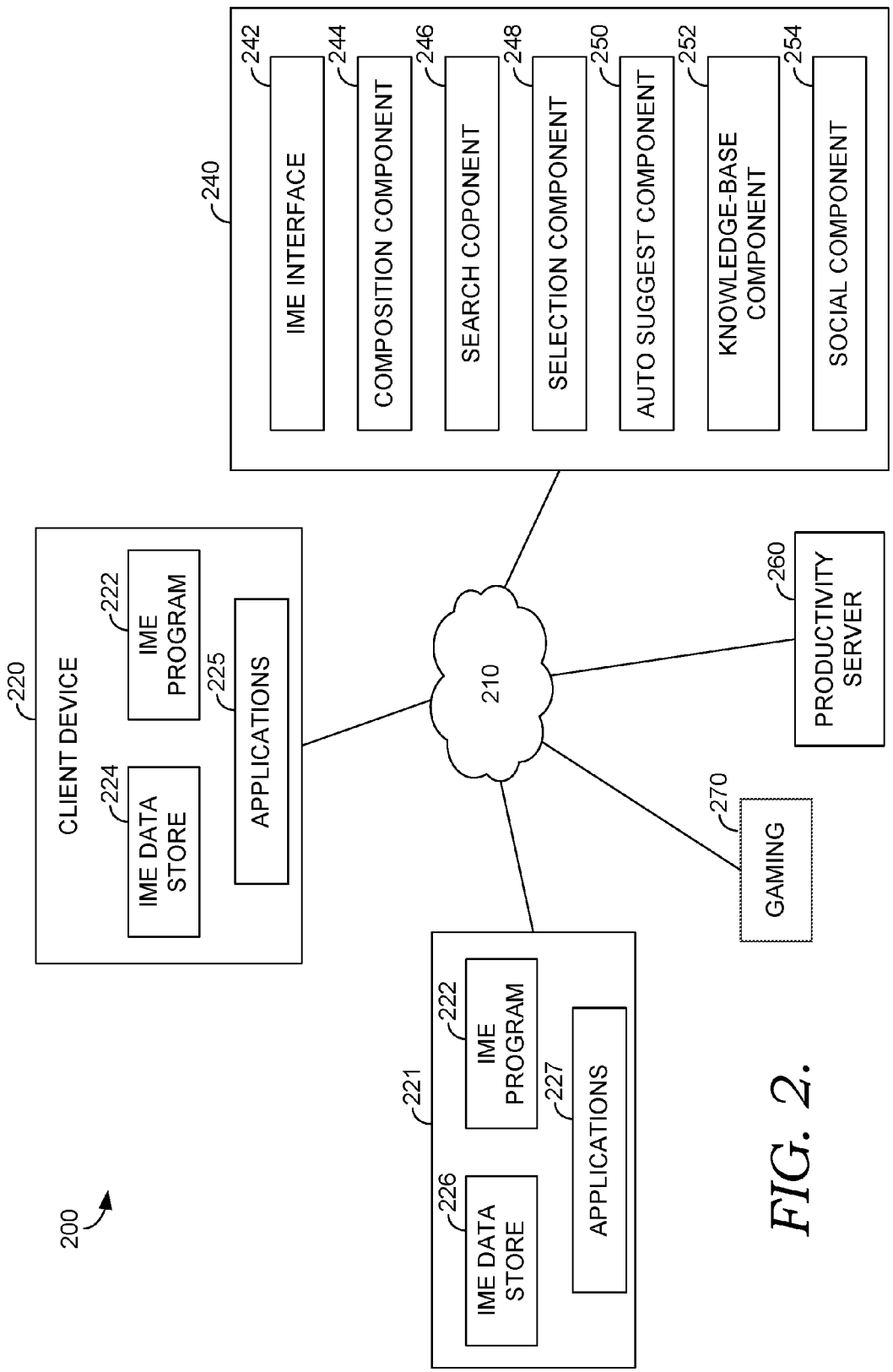
FIG. 2 is a diagram of a computing environment suitable for providing contextual-services, in accordance with an embodiment of the present invention.

Turning now to FIG. 2, an exemplary computing system environment 200 for providing contextual services in association with a keyboard, or other IME, is shown, in accordance with an embodiment of the present invention. The computing system environment 200 shown in FIG. 2 is merely an example of one suitable computing system environment and is not intended to suggest any limitation as to the scope of use or functionality of embodiments of the present invention. Neither should the computing system environment 200 be interpreted as having any dependency or requirement related to any single module/component or combination of modules/components illustrated therein.

The components/modules illustrated in FIG. 2 are exemplary in nature and in number and should not be construed as limiting. Any number of components/modules may be employed to achieve the desired functionality within the scope of embodiments hereof. Further, some of the components/modules may be located on any number of servers or client computing devices. By way of example only, the contextual-service component 240 might reside on a server, cluster of servers, or a computing device remote from one or more of the remaining components.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components/modules, and in any suitable combination and location. Various functions described herein as being performed by one or more entities may be carried out by hardware, firmware, and/or software. For instance, various functions may be carried out by a processor executing instructions stored in memory.

FIG. 2 will be described with reference to using a keyboard as the input mechanism "IME," but embodiments the present invention are not limited for use with a keyboard. The IME could be speech recognition technology, touch screen, or some other input mechanism. The computing system environment 200 includes device 220 and device 221 communicatively coupled to productivity server 260, gaming server 270, and contextual services component 240 from network 210. Network 210 may include, without limitation, one or more local area networks (LANs) and/or wide area networks (WANs). Such networking environments are commonplace in offices, enterprise-wide computer networks, intranets and the Internet. Accordingly, the network 116 is not further described herein.

Computing devices 220 and 221 may be smart phones, slates, e-readers, personal computers, or the like. The devices 220 and 221 may have components similar to those described with reference to computing device 100. The devices 220 and 221 have a display device or are coupled to an independent display device that is configured to display information to the user, for instance, information relevant to communications initiated by and/or received by the devices 220 and 221, browsing activity, contextual services, and the like. Embodiments are not intended to be limited to visual display but rather may also include audio presentation, combined audio/visual presentation, and the like.

Device 220 includes an IME program 222, an IME data store 224, and a group of applications 225. The group of applications 225 could include hundreds or thousands of applications including a word processor, web browser, spreadsheet, database, game, book application, media player, and other applications. In addition, device 220 may have an operating system. In one embodiment, the IME program 222 is part of the operating system. In another embodiment, the IME program 222 is separate from the operating system but closely associated with the input mechanism (e.g., keyboard).

The IME program 222 may be associated with multiple input mechanisms. For example, the IME program 222 may provide contextual capabilities to a hardware keyboard, a virtual or touch-screen keyboard, and speech recognition technology. Alternatively, each input mechanism may have its own dedicated IME program. Only one IME program 222 is shown for the sake of simplicity in FIG. 2.

The IME data store 224 saves contextual information relevant to device 220. In various embodiments, such information may include, user profile data, computing device state data, routine search behaviors, recent text and/or email conversations engaged in by the user, events scheduled on the user's electronic calendar, multimedia events engaged in by the user (such as listening to music, playing a game, watching television programming, etc.), links to uniform resource locators (URLs) frequented by the user, links to URLs having information associated with events scheduled on the user's electronic calendar and/or with keywords extracted from text and/or email conversations engaged in by the user, and/or the like. The profile data may include writing or speaking patterns for a unique user. In embodiments, the IME data store 224 is configured to be searchable for one or more of the items stored in association therewith. Though illustrated as a single, independent component, the data store 224 may, in fact, be a plurality of storage devices, for instance a database cluster.

In addition to contextual data specific to the device 220, the IME data store 224 may store information used to provide a contextual service. For example, user preferences for how and when contextual services are provided may be recorded in the IME data store 224. The user preferences may include an opt-in or opt-out to policies that determine how contextual information is used or shared.

The device 221 also includes IME program 222. This illustrates that the same IME functionality may reside on multiple computing devices. IME data store 226 may have a similar function and type of information as previously described with IME data store 224. However, some of the information within IME data store 226 may be different from that in IME data store 224 because it relates to activities occurring on the particular device. The IME data store 226 may also differentiate between multiple users known to use device 221. Device 221 includes a group of applications 227.

The productivity server 260 includes software and hardware to enable a remote productivity service. The remote productivity surfaces may be described as a cloud based productivity solution. For example, the productivity server 260 may enable device 220 to access a remote word processing application, remote e-mail application, remote database application, remote video editing application, and the like.

The gaming server 270 provides a remote gaming experience for client devices. The games may be rendered by gaming server 270 and manipulated in response to inputs received from client devices. In another embodiment, the gaming server 270 enables multiplayer games by tracking interactions between players and the gaming environment remotely while the game images are generated by the client devices. The devices 220 and 221 could be game consoles.

The contextual services component 240 provides contextual services to device 220 in cooperation with IME program 222. The contextual services component 240 may operate in a data center or other remote computing facility that is capable of interacting with numerous users simultaneously. The contextual services component 240 comprises an IME interface 242, a composition component 244, a search component 246, a selection component 248, an auto suggest component 250, a knowledge-based component 252, and the social component 254.

The IME interface 242 receives contextual information from IME program 222 and distributes the information to other components within the contextual service component 240. The IME interface 242 also returns contextual services that are relevant to the contextual information. The contextual services are communicated to the IME program 222, which in turn takes steps to output the contextual service to the user.

The composition component 244 uses contextual information to help the user compose text. The compositional service may be provided as an auto suggest word or auto complete word. The auto complete word attempts to determine what word or words the user is attempting to input based on a text fragment received as part of the contextual information. The auto complete suggestion starts with the text fragment and adds characters to form a word or phrase. The composition component 244 may use a dictionary that returns commonly used phrases that are consistent with the text fragment. The composition component 244 may also take into account words used within an active document or e-mail to determine which word the user is mostly likely to be entering. When the active application is an e-mail application, words within an e-mail conversation related to an email being composed may be evaluated to prioritize which words the user is likely entering. Similarly, the user's vocabulary may be analyzed based on other documents generated by the user to determine which word the user is entering.

The search component 246 returns search results that are responsive to a text fragment or recently entered text. In addition to returning search results, suggested search queries may be returned by the search component 246. The suggested search queries and common search result may be based on searches conducted by numerous users to determine the likely search query.

The search component 246 may return posts from the user's social network. For example, a social post from a recipient of an email being drafted may be presented when keywords within the email match keywords within the social post. In an example, a user is currently attending a ball game at a particular arena. The search component 246 utilizes the state information (location and time) of a device to automatically provide output of a game roster and player statistics.

In another example, a user visits a large retail store and finds an item he may wish to purchase. He utilizes the computing device camera, which is another example of an IME program, (e.g., cell phone camera) to take a picture of the barcode. On the computing, the barcode is sent to an application that reads the barcode and provides information. At the same time, the barcode is sent to search component 246 and a price comparison page for the item is provided as a contextual service. Still further, a user checks into a hotel in city X, opens a browser, and navigates to search engine. As the system is aware this is the time the user generally eats dinner, a listing of nearby restaurants for the user's favorite cuisine, as well as a map and a mobile coupon are presented all as part of the contextual service. The user did not even need to enter a query, but an intent to search and the purpose of the search was determined by context.

The selection component 248 determines which contextual service is provided to the user at a point in time, if any by evaluating the contextual information to determine a user's active task and likely need for a contextual service. Upon making an intent determination, an instruction is sent to one or more other components to generate the service. In another embodiment, the various components present or generate their respective contextual services but the selection component 248 determines whether or not the service should be provided to the user at the present time. For example, the selection component 248 may determine that the user does not have intent to search, and therefore, search results or suggested search queries, are not presented to the user. Instead, the composition component 242 provides auto completion suggestions that are presented to the user in responses to an intent to compose.

The selection component 248 is configured for selecting at least one contextual service using the contextual information received by the IME interface 242. The selection component 248 may comprise one or more rules that utilize the contextual information to determine contextual services that the user has an increased likelihood of using. The selection component 248 may include utilization of profile data associated with the user, data associated with the current state of the computing device (which may include a current time and/or location of the computing device), or a combination of profile data and current state data to select the at least one contextual service. In embodiments, profile data may be provided directly by the user and may include information such as age, sex, marital status, home and work addresses, or the like. Profile data may also include preference data, such as a particular coffee shop, fast food franchises, and so forth preferred by the user. Dislikes may also be provided. In embodiments, the at least one contextual service includes one of visible information, audible information, or a combination of visible and audible information.

The selection component 248 may mine data associated with the user and/or the computing device for use in selecting appropriate contextual services for output. For instance, the selection component 248 may be configured to mine at least a portion of profile data associated with a user, data associated with a current state of the computing device, data indicative of a user's interactions with the device, user-activity data, data cached in association with the computing device and/or the contextual services used previously, and/or any combination thereof. Data may be mined from the user's activities and other data sources occasionally, e.g., periodically and/or after some threshold amount of activity is reached, such as every fifty telephone calls. Examples of data mined from such activities include telephone numbers frequently called, calling patterns (e.g., analyzed through collaborative filtering and graph analysis), email addresses to which messages are regularly sent, other searches and advertisements, other application logs, location tracks, SMS content, and so forth. Examples of other information include things like social networking buddy lists, past purchases made via this device or an associated device, and the like. In embodiments, various profile data may be merged into a suitable data structure and, if desired, persisted in association with the user or device, such as by the device's telephone number. In this manner, profile data is regularly available to assist in decision making with respect to selecting contextual services to present, as more fully described below.

In embodiments, as part of the contextual service selection, keywords are extracted from data that is mined or otherwise received (e.g., by receiving IME interface 242) and such extracted keywords are utilized as input into a search engine to aid in determining appropriate contextual services to provide for output. For instance, if a user receives an SMS that reads "let's meet at restaurant X at 7:00 pm," the keyword "restaurant X" may be extracted and utilized as input into a search engine to cause retrieval of a map to and menu for restaurant X (or a link thereto). Subsequently, upon receiving an indication that the user desires a context-aware search to be conducted, the map and menu may be automatically presented—without the user inputting any keywords into the search engine themselves. Such contextual service retrieval may take place because the user is viewing the SMS message at the time the context-aware search is requested and/or because a context-aware search is requested in close time proximity to the 7:00 pm dinner appointment. In embodiments, the contextual service selection logic utilizes likelihoods/probabilities to reconcile which of multiple contextual services to provide for presentation. Each of these embodiments is more fully described below.

The selection component 248 is configured for determining which of a plurality of contextual indicators are more likely to generate desired contextual services and/or which of a plurality of contextual services are most likely to be desirable to the user to have presented at a particular point in time. For instance, if a user's electronic calendar indicates s/he is to meet a friend for dinner at 7:00 pm at a particular restaurant, is receipt of a contextual indicator of the friend's identity, the current location of the user, and/or the identity of the restaurant more likely to generate contextual services the user desires to view at a particular point in time than a contextual indicator that the user routinely checks traffic conditions at 6:00 pm before leaving his or her office? Or, is a contextual service linking to the friend's social networking page, a contextual service indicative of the restaurant menu, a contextual service linking to directions from the user's current location to the restaurant, and/or a contextual service linking to traffic conditions between the user's current location and the restaurant more likely to be desirable to the user to view?

In an embodiment, the selection component 248 is configured to receive input of a plurality of contextual services and utilize one or more statistical methodologies to assign a probability (or likelihood) to each. Those contextual indicators and/or contextual services having the highest probability or likelihood that the user desires to view them, when taken into context of the remaining contextual indicators and/or contextual services, are utilized to provide the appropriate output to the user, as more fully described below. Embodiments hereof are not limited to uses of any particular statistical methodology and, accordingly, particular methodologies are not further described herein.

The auto suggest component 250 suggests various tasks or points out capabilities to the user that may help complete a task the user has a present intent to complete. For example, a user attempting to edit a picture may be provided a link to the productivity service 260 that allows the user to complete the picture editing using the productivity service 260s picture editing service. In another embodiment, if the user appears to be shopping, or researching a product, specific websites or other resources that are able to help the user with that task are suggested.

The knowledge-based component 252 provides factual content related to the user's recent input. For example, when the user types in "George B," the knowledge base may provide information about president George H. W. Bush and-or president George W. Bush. The context may be considered, for example, if the user is writing about the war on terror, then the factual information may relate only to George W. Bush the 43$^{rd}$ president. Similarly, if the user's recent input described Mount St. Helens, then factual information related to Mount St. Helens may be presented by the knowledge-based component 252.

The social component 254 surfaces information related to their present input from their social network. For example, when the user is composing an e-mail, previous posts by a recipient of the e-mail may be summarized and described. For example, a user browses her contact list until she arrives at John Doe's listing, at which point the context-aware search feature is provided. In this instance, John Doe's social networking page is presented for review before making the call.

Figure 3:
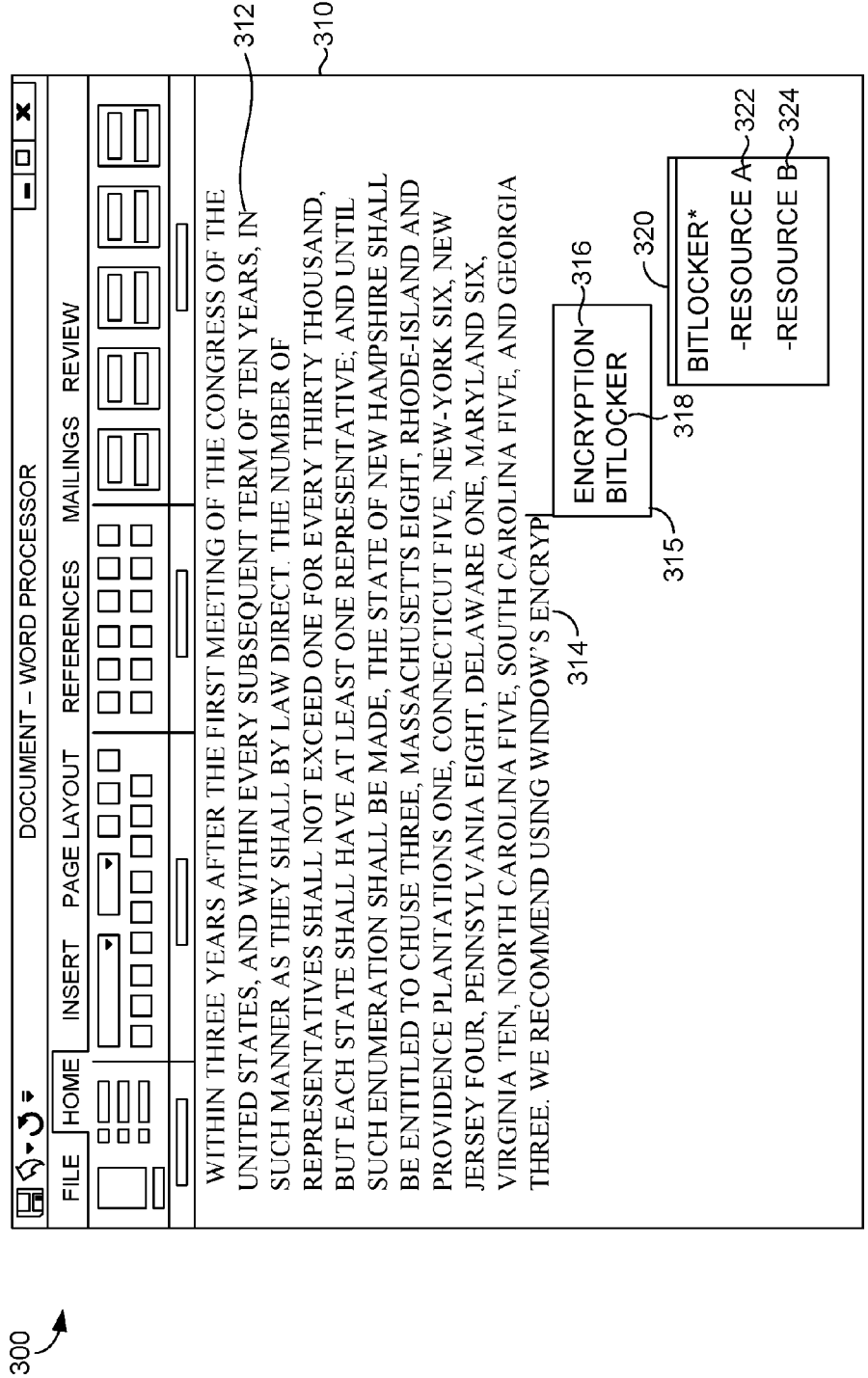
FIG. 3 is a diagram of a word processor's user interface presenting composition assistance, knowledge base info, and a contextual search, in accordance with an embodiment of the present invention.

Turning now to FIG. 3, contextual interface services are illustrated, in accordance with an embodiment of the present invention. FIG. 3 shows an application window 300 for a word processing application. Embodiments of the present invention are not limited to operation with a word processing application. For example, the contextual interface services could be provided in an email application, spreadsheet, and social media application. The application window 300 includes text 312, the last sentence of which states, "we recommend using Windows' encryp." In this case, "encryp" is a text fragment 314. Composition-assistance interface 315 includes an autocomplete 316 suggestion, which is the word "encryption." The autocomplete service works using a dictionary, or other corpus of words, to add letters to the text fragment 314 to form a known word or phrase. The second suggestion "BITLOCKER®" 318 is not an autocomplete. Instead, "BITLOCKER®" 318 is an example of an auto-suggest. The autosuggest is not based on completing a word or phrase by adding letters to a text fragment, but instead evaluates the context of the text fragment to suggest a word or phrase consistent with the meaning of what the user is typing. Here, BITLOCKER® is the name of Windows' encryption software. Selecting BITLOCKER® could replace "Windows' encrypt" or just the "encrypt" portion. The user may select the composition suggestion instead of typing and the word and the selected word will be used to replace the text fragment 314.

FIG. 3 also includes a research assistance interface 320. The content of the research assistance interface 320 provides additional information about subject matter described in the text 312. The additional information could be in the form of search results, knowledge based entries, suggested queries, and the like. In this case, the research assistance interface 320 includes knowledge based entries resource A 322 and resource B 324, both related to BITLOCKER®. In one embodiment, the research assistance interface 320 includes a search box (not shown) that is automatically populated with user input as it is added to the text 312. When the words form a query of interest, then user need only select a search button (not shown) in the research assistance interface 320 to request the search. Contextual information may be used in conjunction with the query to form search results that are presented in an updated search result interface.

When a new word begins or a word is selected from the composition assistance interface 315, then a new is automatically conducted. In one embodiment, only keywords are considered for submission in query. In another embodiment, the user is able to type search terms into a search box associated with the research assistance interface 320. The search is conducted using contextual information from document 310.

Figure 4:
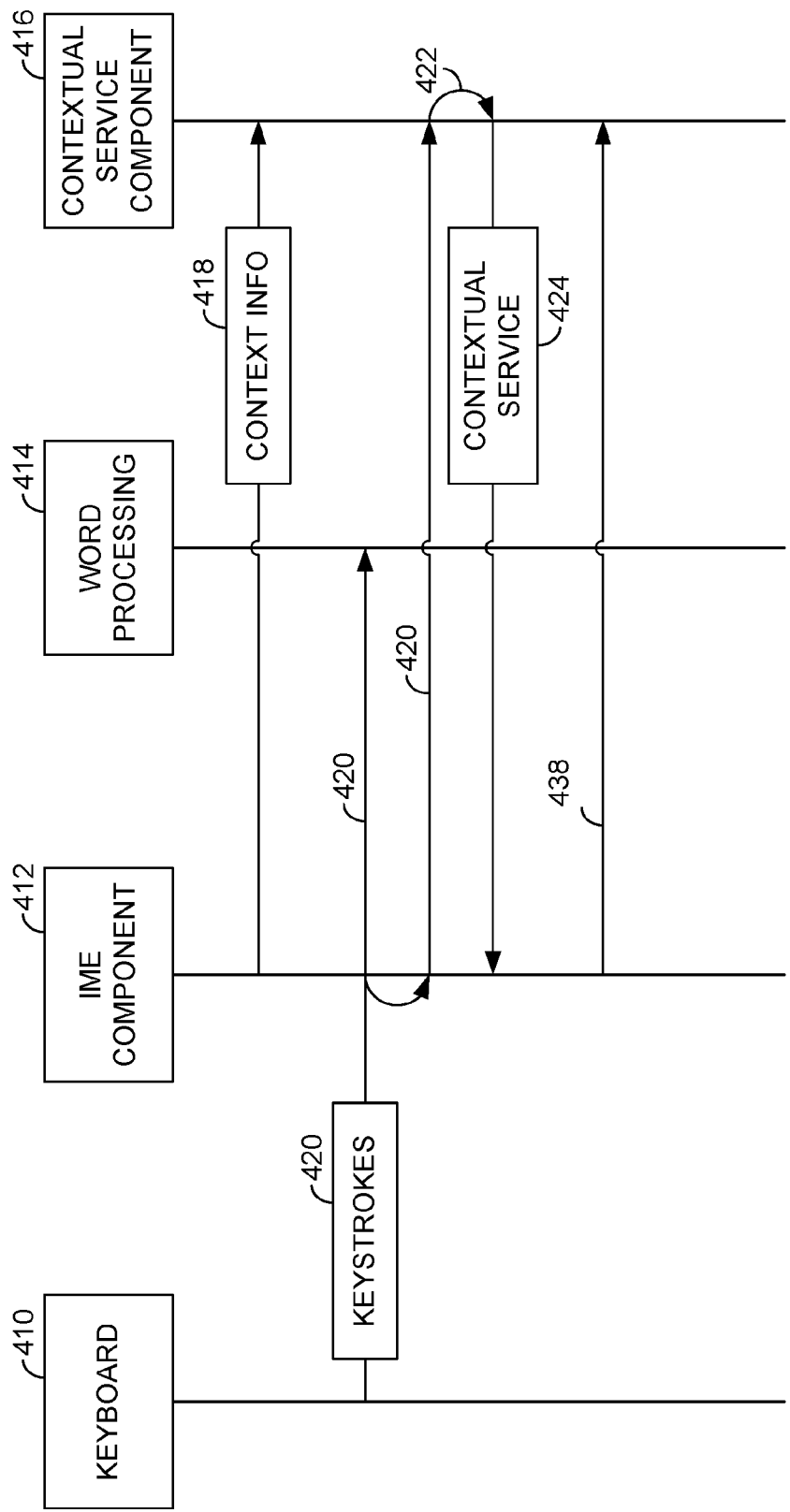
FIG. 4 is a sequence diagram illustrating communications occurring between a computing device and a remote contextual-service component as a contextual service is provided to the computing device by the remote contextual-service component, in accordance with an embodiment of the present invention.

Turning now to FIG. 4, a sequence diagram showing communications occurring between components used to provide a contextual service is shown, in accordance with embodiment of the present invention. The components in FIG. 4 include: a keyboard 410; an IME component 412; a word processing application 414; and a contextual service component 416.

The keyboard 410 may be a separate piece of hardware or a soft-keyboard presented on a touch screen. The IME component 412 enables the functionality of the keyboard, 410. The IME component 412 may be integrated into or part of an operating system. The IME component 412 enables the keyboard 410 to operate as an input device across multiple applications.

The word-processing application 414 is an exemplary application that may consume the keyboard's 410 input. Embodiments of the present invention also work with applications such as databases, spreadsheets, email applications, games, entertainment services, web browsers, and the like.

The contextual service component 416 may be similar to the contextual service component 240, described previously with reference to FIG. 2. The contextual service component 416 provides contextual services to multiple computing devices. The IME component 412 and the contextual service component 416 may operate on different computing devices. For example, the contextual service component 416 may operate or be provided by a data center that connects with a computing device that is associated with the keyboard 410, the IME component 412, and the word processing application 414. As mentioned with reference to FIG. 2, the data center serving the contextual service component 416 may communicate with one or more computing devices over a wide area network, such as the Internet.

The IME component 412 communicates contextual information 418 to the contextual service component 416. As mentioned, the contextual information 418 may be transmitted over a network such as the Internet. The contextual information 418 includes information about the computing device and the user or users of the computing device. The contextual information 418 may include information about a user's preferences or habits. For example, the users browsing history, search history, and other activities performed on the computing device may be provided. In addition, demographic information about the user may be provided when available. The IME component 412 may provide user opt-ins and opt-outs to specify what type of information may be provided to the contextual service component 416. An interface may be provided by the IME component 412 for this purpose.

The contextual information 418 also includes information about a present activity. For example, the contextual information 418 may include information describing an open document in the active application. For example, when the active application is a word processing application the contextual information could include key words or text within the open word processing document. If the open application was an email or texting application, key words from an open email chain, which could include multiple communications between the same parties with a related subject matter, could be provided. Contextual information helps the contextual service component 416 understand what the user's present intent is and what contextual services might be helpful to the user.

The keyboard 410 receives keystrokes from the user. These keystrokes 420 are communicated to the IME component 412. The keystrokes 420 are also communicated to the word processing application 414 by the IME component 412. The word processing application 414 will manipulate the open document in response to the keystrokes. For example, if a user is composing a word, then the letters or numerals corresponding to the keystrokes will appear on the screen as they are received by the word processing application 414.

Groups of keystrokes or the individual keystrokes 420 are communicated to the contextual service component 416 by the IME component 412. The keystrokes 420 are evaluated 422 by the contextual service component 416 to determine whether a relevant contextual service may be appropriate. The types of contextual services that may be provided have been described previously.

When the evaluation 422 indicates that a contextual service would help the user complete a task, such as composing a word or conducting research, the contextual service instruction 424 is communicated to the IME component 412. The IME component 412 then generates an interface that presents one or more contextual services to the user. As shown in FIG. 3, and as subsequently explained in FIG. 5, the interface may be an overlay of an active interface. Upon receiving a request 438 from the user through the keyboard 410, or through some other input mechanism, such as a mouse, voice command, or touch screen, the contextual service is provided. For example, the IME component may delete words or recent keystrokes and replace them with a word selected by the user through the contextual interface. Using the example of FIG. 3, the IME component 412 may delete the letters in "encrypt" and replace them with the word or keystrokes forming the word "encryption." The communications shown in FIG. 4 may repeat as additional keystrokes are added and contextual services are selected.

Figure 5:
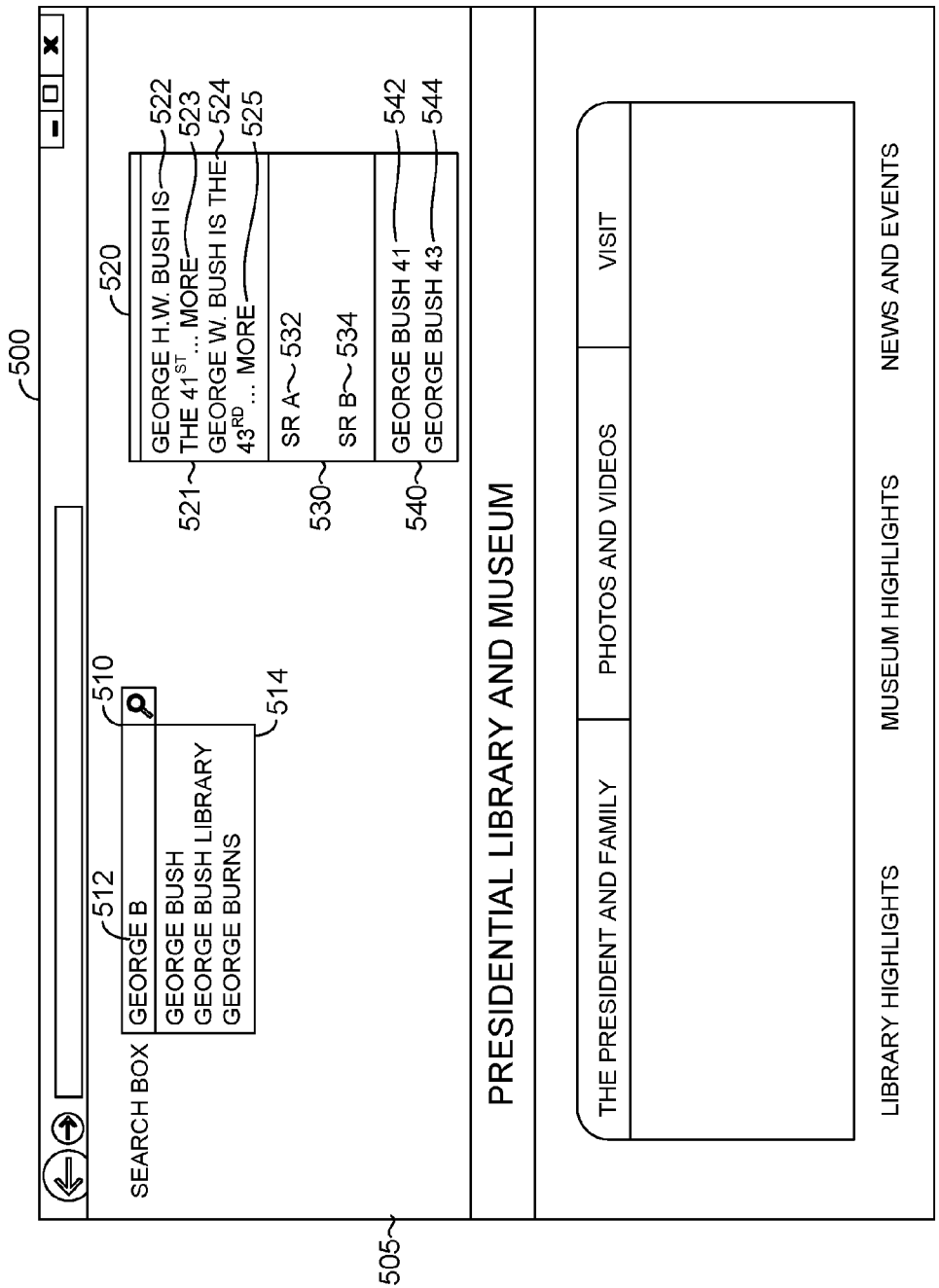
FIG. 5 is a diagram of a word processor's user interface presenting a contextual search contemporaneously with query input box, in accordance with an embodiment of the present invention.

Turning now to FIG. 5, a contextual search service is illustrated in accordance with an embodiment of the present invention. FIG. 5 illustrates a web browser 500 showing a web page 505 related to a presidential library and museum. The webpage 505 includes a search box 510. As can be seen, keystrokes 512 forming "George B" have been entered into the search box 510. The search box has a native auto-complete 514 feature that automatically presents some query suggestions.

The IME component on the computing device sends the keystrokes 512 to a contextual service provider that provides instructions for a contextual search interface 520. The contextual search interface 520 may be presented in an overlay that does not overlap the search box 510. In other words, the contextual search interface 520 may be presented as an alternative that the user can navigate to and select one or more search results or suggested queries if they are unsatisfied with the native auto-complete 514 feature associated with the search box 510.

The contextual search interface 520 includes three sections of useful search information. The first section includes a knowledge base section 521 that presents entries related to the intended search. The first entry indicates that George H. W. Bush is the $41^{st}$ president 522. The user can learn more about the $41^{st}$ president by selecting the "more" button, 523. This could open a new interface or cause the user to navigate to a portion of the website related to the $41^{st}$ president or to a separate website about the $41^{st}$ president. The second knowledge entry indicates that George W. Bush is the $43^{rd}$ president 524. The user can learn more about the $43^{rd}$ president by selecting the "more" button 525.

The second section of the contextual search interface 520 is a search results section 530. The search results section 530 includes a first search result 532 and a second search result 534. These two may be the most relevant search results returned in a response to a presumptive search query related to "George B." For example, the search results could be related to George Bush. However, contextual information may be used to disambiguate between different George Bushes. For example, if the user was recently working on a document related to George Bush the $43^{rd}$ president then both of the search results could be related to George W. Bush the $43^{rd}$ president.

The search section 540 of the contextual search interface 520 includes suggested search queries. Selecting either "George Bush 41" 542 or "George Bush 43" 544 will cause search results to be presented in a separate interface generated by the contextual search service. In addition, selecting a suggested search query, such as "George Bush 41" 542, will cause the search query to be entered into search box 510. This gives this user the alternative to see results presented by the native search interface on webpage 505 and search results presented by the contextual service.

Figure 6:
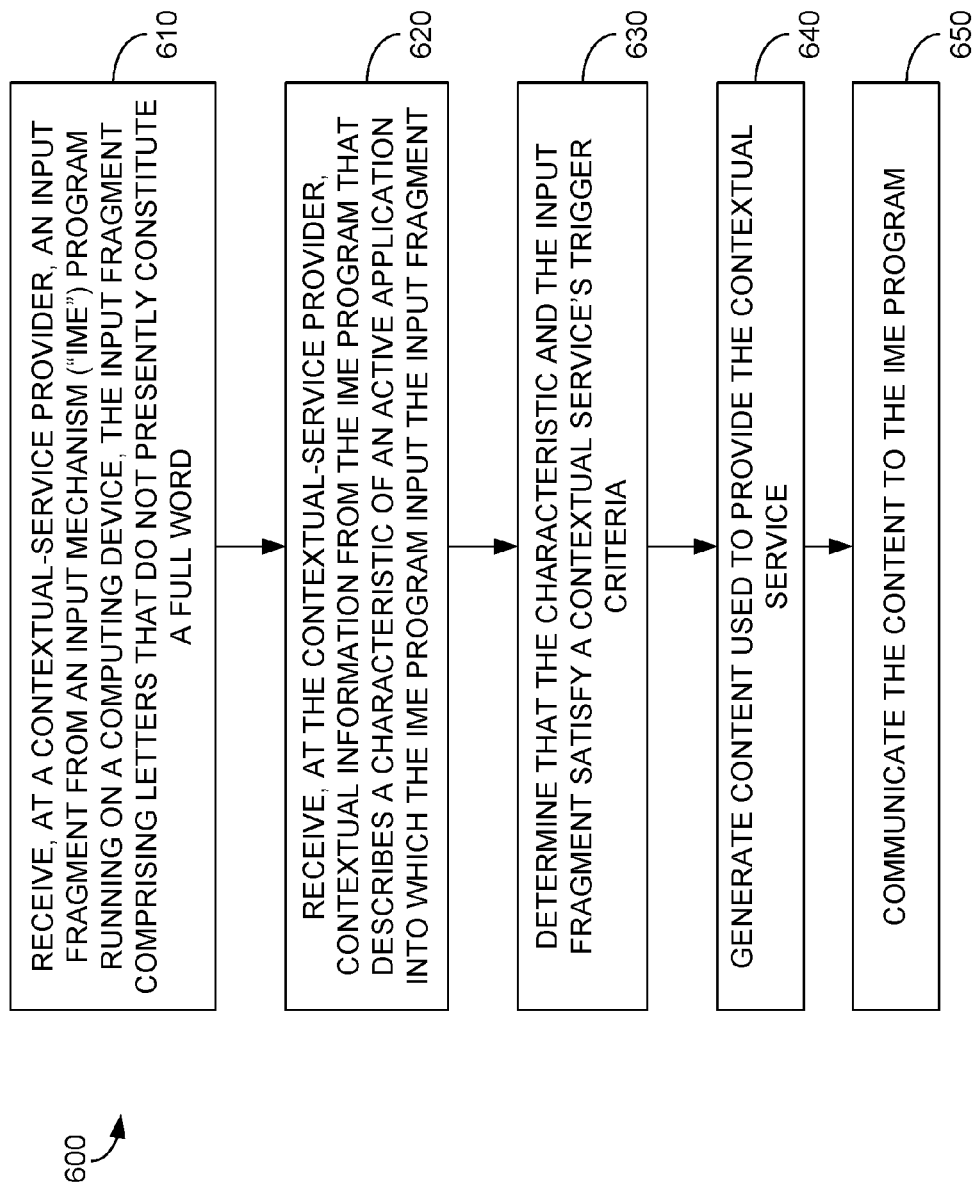
FIG. 6 is a flow diagram showing a method for providing contextual services in association with an input mechanism, in accordance with an embodiment of the present invention.

Turning now to FIG. 6, a method 600 for providing contextual services in association with an input mechanism is shown, in accordance with an embodiment of the present invention. The input mechanism may be a hard keyboard, a soft keyboard, a speech-recognition mechanism, a handwriting recognition system, or the like. Contextual services include composition assistance, search assistance, grammatical assistance, and a knowledge base. The contextual service of method 600 may be provided by a contextual-service provider that is remote from a computing device associated with the input mechanism.

At step 610, a text fragment is received from an input mechanism ("IME") program running on a computing device. The text fragment may be received at a contextual service provider that is remote from the computing device. For example, the text fragment may be communicated over a network such as the Internet. The text fragment comprises letters that do not presently constitute a full word. When evaluating whether a text fragment comprises a full word, the letters are evaluated in the order in which they are received. In other words, the fact that the letters could be rearranged to form a full word is not relevant to the analysis of step 610.

At step 620, contextual information is received from the IME program. The contextual information is also received at the contextual-service provider. The contextual information describes a characteristic of an active application into which the IME program input the text fragment. For example, characteristics of a word processing document in an active word processing application may be communicated. Similarly, characteristics of an email that is being edited in an active email application.

At step 630, the characteristic and the text fragment are determined to satisfy a contextual service's trigger criteria. Each contextual service may have a separate trigger criteria. The characteristic and the text fragment may satisfy the contextual criteria of multiple contextual services. The trigger criteria attempt to ascertain a user's intent. The intent may be determined with a degree of confidence that is built into the trigger. Once the threshold degree of confidence is satisfied then the trigger is satisfied. The degree of confidence and trigger may be analyzed using a machine-learning algorithm. The machine-learning algorithm may be trained using sample data. Once initially trained, the machine-learning algorithm may evaluate the behavior of the specific user as well as hundreds of thousands of other users that use the contextual service. The machine-learning algorithm identifies patterns in user behavior that indicate when a user is completing a task and what information will be useful to complete the task. For example, upon presenting a search interface that is not selected or used by the user in a scenario, the machine-learning algorithm will lower the probability that other users want the search interface when the same contextual characteristics occur in the future.

At step 640, the contextual service is generated. The contextual service may be generated by contextual-service provider. At step 650, the contextual service is communicated to the IME program. The IME program may then present the contextual service to the user in conjunction with the active application or task the user is attempting to complete. The contextual service may be provided in an overlay. In another embodiment, the active program may be adapted to consume the contextual service in a way that is integrated with the active interface.

Figure 7:
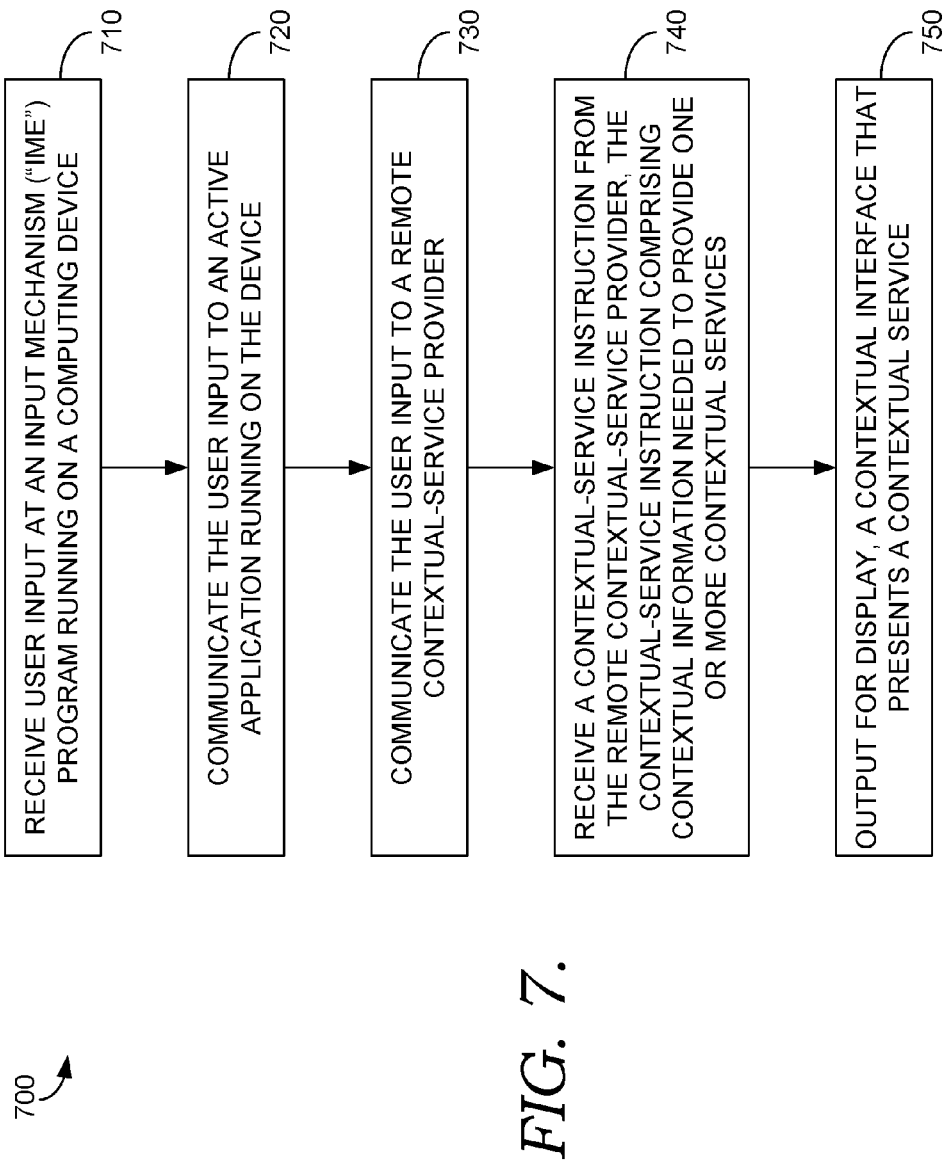
FIG. 7 is a flow diagram showing a method for providing contextual services, in accordance with an embodiment of the present invention.

Turning now to FIG. 7, a method 700 for providing contextual services in association with an input mechanism is provided, in accordance with an embodiment of the present invention. Method 700 may be performed by an input mechanism program running on a computing device, such as a laptop, tablet, or mobile device. At step 710, user input is received at an IME program running on a computing device area as mentioned previously, the IME program enables and associated input mechanism. Exemplary input mechanisms include a hard keyboard, a touch screen keyboard, a gesture interface, a speech interface, and a writing interface. The gesture interface may use image data to detect a gesture. In this case, the IME program may receive the image data and generate a corresponding output with meaning to an application. The gesture could select a letter or character or word or provide a control instruction such as to navigate to a different page of an interface.

At step 720, the user input is communicated to an active application running on the device. For example, the user input could be communicated to a web browser, word processing application, email application, or some other application running on the computing device. Embodiments of the present invention use describing IME program is able to communicate with multiple applications. As mentioned, the IME program may be associated with the operating system of the computing device. The user input may be a keystroke, text fragment, word or phrase. A keyboard is more likely to generate input comprising a single character whereas a gesture or speech interface is more likely to generate words or phrases as input.

At step 730, the user input is communicated to a remote contextual-service provider, such as contextual-service provider 240. The user input may be a keystroke, text fragment or a series of words. Embodiments of the present invention may group user input in a meaningful way for communication purposes. In one embodiment, each keystroke is communicated individually. In another embodiment, a series of keystrokes are communicated together. In yet another embodiment, a filter is in place on the computing device to communicate a threshold group of meaningful keystrokes together that are likely suitable for use by the contextual service. For example, when more than four characters are entered without a space the four letters may be communicated together as a user input. A threshold could be set at different amounts of letters, but the purpose is to avoid evaluating short words that are unlikely to need composition assistance. The user is more likely to consume composition assistance with longer words, such as those having four or more characters. The above example is from the English language, but different thresholds could be in place for other languages such as Asian languages that use mostly characters without spaces. When user input is not communicated immediately because of a threshold filter, the input may be subsequently communicated as part of contextual information that is provided.

At step 740, a contextual service instruction is received from the remote contextual service provider. The contextual-service instruction comprises contextual information needed to provide one or more contextual services. For example, contextual information needed to provide composition assistance may be one or more words to suggest to the user as they are inputting text. For a contextual search, one or more search results may be provided within the contextual information. In addition to the contextual information, the contextual-service instructions may define aspects of a contextual interface that is to be presented. For example, the size and location of the contextual interface may be presented within the instructions. In another embodiment, the IME program determines the characteristics of the contextual interface without input from the contextual-service provider.

At step 750, a contextual service is output for display. The contextual interface is output for display in conjunction with a user interface associated with an active application to which the user input was provided. For example, the potential interface may be a search interface presented off to the side of a word-processing window. The contextual interface may take the form of an overlay. The size and location of the contextual interface may be selected to avoid interference with areas of the active interface that are a present focal point for the user. For example, the user may be typing a sentence at part of a document. The area adjacent to and around the sentence may be off limits for certain contextual interfaces, such as search results. On the other hand, composition assistance may be provided directly below text as it is entered. The user then they may select the suggested word or phrase instead of continuing to type the entire word. Each auto suggested word or auto completed word may be associated with a short key that the user may press to select that particular word or phrase. For example, each auto suggested word could be associated with a number that the user can type to select the word.

In one embodiment, the input mechanism includes a control that allows the user to turn on or turn off the contextual service functionality. For example, a hard or soft keyboard may include a dedicated key that activates and deactivates the contextual service functionality. In one embodiment, upon activating the service, a search intent is automatically inferred and contextual search results are generated based on recent user input in the context.

Figure 8:
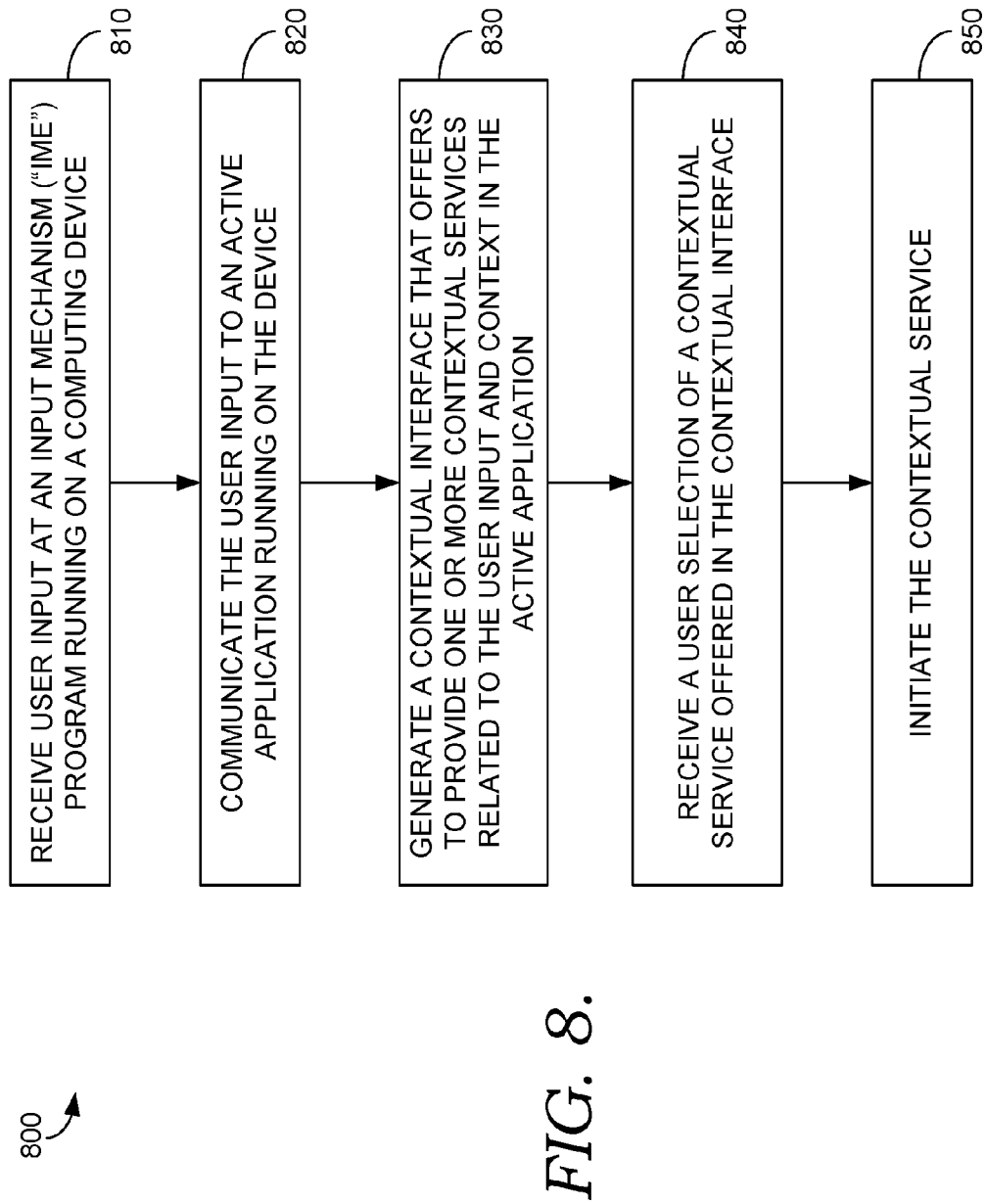
FIG. 8 is a flow diagram showing a method for providing a contextual service interface, in accordance with an embodiment of the present invention.

Turning now to FIG. 8, a method 800 of providing a contextual service interface in association with an input mechanism is provided, in accordance with an embodiment of the present invention. At step 810, a user input is received at an input mechanism program running on a computing device. The IME program enables and associated input mechanism that provides input to multiple applications on a computing device. At step 820, the user input is communicated to an active application running on the device. The active application is the application with which the user is presently interacting. As is known, multiple applications may be running simultaneously on a computing device. And at times many of the interfaces associated with these applications may be viewed simultaneously. However, the IME program is only inputting text into one application at a time. The application that is receiving the input is said to be the active application.

At step 830, contextual interface is generated it offers to provide one or more contextual services related to the user input and context in the active application. The contextual interface may take the form of an overlay and may be split into multiple overlays. That is to say the content of contextual interface may comprise a composition assistant that is located at a first part of the screen near the text being implemented and a second interface that provides search results that are separate from the composition assistance.

At step 840, a user selection of a contextual service offered in the contextual interface is received. For example, the user may have selected composition assistance, such as grammatical or usage assistance. At step 850, the contextual service is initiated. Initiating the contextual service may include communicating with a contextual-service provider that is remote from the computing device. In another embodiment, initiating the contextual service causes the contextual interface to be updated to provide a fuller explanation of available contextual available information related to the contextual service. For example a full entry related to grammatical usage may be provided where only a snippet was shown.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention. The present invention has been described in relation to particular embodiments, which are intended in all respects to be illustrative rather than restrictive.

What is claimed is:

1. One or more computer storage media having computer-executable instructions embodied thereon, that when executed, cause a computing device to perform a method for providing a contextual service in association with an input mechanism, the method comprising:
receiving over a computer network, at a contextual-service provider, an input fragment from an input mechanism ("IME") program running on a computing device;
receiving, at the contextual-service provider, information from the IME program that describes a characteristic of an application into which the IME program input the input fragment;
determining, at the contextual-service provider, that the characteristic and the input fragment satisfy a contextual service's trigger criteria that causes a contextual service to be generated;
generating content used to provide the contextual service; and
communicating the content to the IME program.

2. The one or more computer storage media of claim 1, wherein the IME program enables a touchscreen keyboard.

3. The one or more computer storage media of claim 1, wherein the characteristic is relevant to determining what task a user of the computing device is presently completing.

4. The one or more computer storage media of claim 1, wherein the characteristic is text within a document presently being composed on the computing device.

5. The one or more computer storage media of claim 4, wherein the contextual service is an autosuggested word or phrase that does not include the input fragment, but that is related by subject matter to a word that that includes the input fragment.

6. The one or more computer storage media of claim 1, wherein the contextual service is a group of facts describing an object with a name that includes the input fragment.

7. The one or more computer storage media of claim 1, wherein the contextual service is a search result generated in response to a query comprising the input fragment.

8. A method for providing a contextual service in association with an input mechanism, the method comprising:
receiving a user input at an input mechanism ("IME") program running on a computing device, the IME program enabling an associated input mechanism;
communicating the user input from the IME program to an application running on the computing device;
communicating the user input from the IME program to a remote contextual-service provider;
communicating from the IME program information that describes a characteristic of the application to the remote contextual-service provider;
receiving at the IME program a contextual-service instruction from the remote contextual-service provider, the contextual-service instruction comprising information needed to provide one or more contextual services; and
outputting for display, a contextual interface that presents a contextual service.

9. The method of claim 8, wherein the IME program enables a gesture interface that uses image data to identify the user input.

10. The method of claim 8, wherein the input mechanism is a touchscreen keyboard, and wherein the input is a text fragment forming less than a full word.

11. The method of claim 8, wherein the method further comprises receiving a user interaction with the contextual interface, automatically generating an input for the application, and communicating the input to the application.

12. The method of claim 11, wherein the application is a web browser open to a web page having an input box, the user input is text entered into the input box, and the contextual service is a search result generated in response to the user input.

13. The method of claim 11, wherein the application is a web browser open to a web page having an input box, the user input is text entered into the input box, and the contextual service is a suggested query generated in response to the user input.

14. The method of claim 8, wherein the input mechanism is a keyboard, and wherein the method further comprises receiving an indication that a contextual-service key on the keyboard has been selected and, in response, activating contextual service functionality associated with the IME program.

15. A computing system comprising:
a processor; and
computer storage memory having computer-executable instructions stored thereon which, when executed by the processor, configure the computing system to:
receive a user input at an input mechanism ("IME") program running on a computing device, the IME program enabling an associated input mechanism that provides input to multiple applications on the computing device;
communicate the user input from the IME program to an application running on the computing device;
communicate the user input from the IME program to a remote contextual-service provider;
receive at the IME program a contextual-service instruction comprising information needed to provide one or more contextual services from the remote contextual-service provider;
generate, by the IME program, a contextual interface that offers to provide one or more contextual services related to the user input and context in the application;
receive a user selection of a contextual service offered in the contextual interface; and
initiate the contextual service.

16. The computing system of claim 15, wherein the contextual interface is an overlay presented with an interface associated with the application.

17. The computing system of claim 15, wherein the contextual service is a composition-assistance service and the contextual interface is displayed adjacent to a point where the user input is added within an interface associated with the application.

18. The computing system of claim 15, wherein the contextual service associates a user with multiple devices through a login to the service and builds a contextual service profile using information from the multiple devices.

19. The computing system of claim 18, wherein the communications include one or more social posts from a social network and emails addressed to or from an address associated with the communication being composed.

20. The computing system of claim 15, wherein the computing system is further configured to communicate the user selection to a contextual service provider that uses the user selection to determine circumstances when the contextual service is relevant to a user.

* * * * *